(No Model.)

D. STONE.
CUFF FASTENER.

No. 364,143. Patented May 31, 1887.

WITNESSES:
John M. Deemer
C. Sedgwick

INVENTOR:
D. Stone
BY Munn & Co.
ATTORNEYS.

UNITED STATES PATENT OFFICE.

DAVID STONE, OF NEW YORK, N. Y.

CUFF-FASTENER.

SPECIFICATION forming part of Letters Patent No. 364,143, dated May 31, 1887.

Application filed November 16, 1886. Serial No. 219,018. (No model.)

*To all whom it may concern:*

Be it known that I, DAVID STONE, of the city, county, and State of New York, have invented a new and Improved Cuff-Fastener, of which the following is a full, clear, and exact description.

This invention relates to cuff or collar fasteners, the object of the invention being to provide a cheap, durable, and efficient fastener, whereby the cuff may be readily secured in such position as may be desired.

To this end the invention consists of a stud formed with a hollow shank adapted to receive a headed pin, the head of the stud being preferably concave and the hollow shank being preferably provided with a spring, all as will be hereinafter more fully described, and specifically pointed out in the claims.

Reference is to be had to the accompanying drawings, forming a part of this specification, in which similar figures of reference indicate corresponding parts in all the views.

Figure 1:
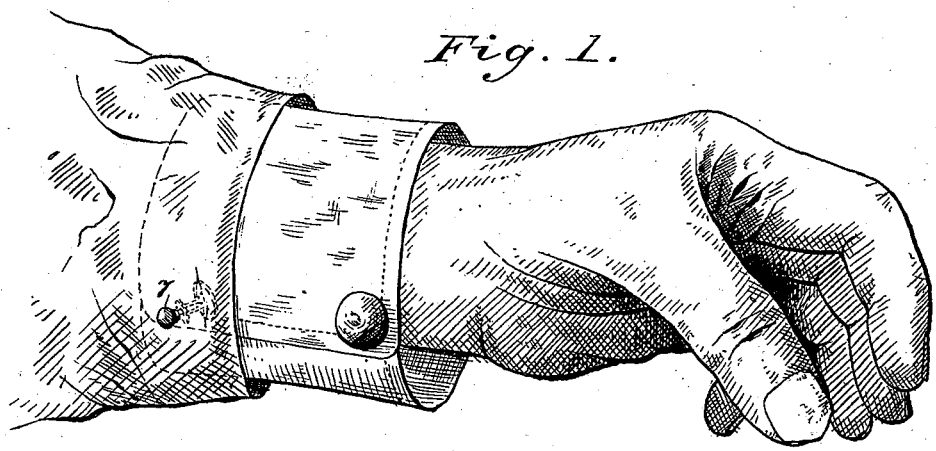
Figure 2:
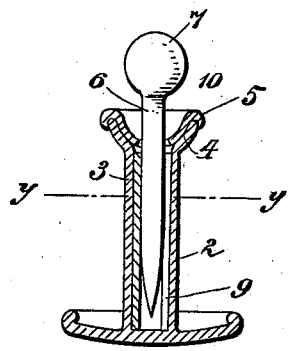
Figure 3:
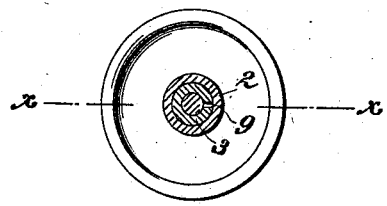

Figure 1 is a view of a hand and a portion of an arm, representing the practical application of my improved form of cuff-holder. Fig. 2 is a central vertical sectional view of the cuff-holder, the view being taken on line $x$ $x$ of Fig. 3; and Fig. 3 is a cross-sectional view of the same, taken on line $y$ $y$ of Fig. 2.

In constructing such a holder as the one represented in the drawings above referred to, I provide a stud wherein the shank 2 is formed with a central bore or chamber, within which there is fitted a spring, 3, that is preferably in the form of a longitudinally-split tube; but any other form of spring could be employed. The spring in the drawings is shown as above described, its longitudinal slit being shown at 9. The lower portion, 4, of the head 10 is made integral with the shank 2, and this portion 4 is preferably concave and faced with an outer cap or covering, 5, that is formed with a central aperture and pressed about the main body of the head, this cap 5 serving as a retaining attachment for the spring 3.

In connection with the stud described I employ a pin, 6, that is preferably formed with an enlarged head, 7, this pin being of proper size to fit closely within the bore of the spring 3, to be held by said spring in close frictional contact.

In operation, the stud is passed through two of the overlapping holes of the wristband, and the wristband is then adjusted to the required position, in which position it may be fastened by passing the pin 6 through the coat or dress sleeve and forcing the pin into the shank of the button, the point of the pin being guided to the central aperture of the facing-plate 5, owing to the concave form of said plate. After the pin has once been adjusted to position it will be held to place by the grip of the spring 3, and it will be readily understood that by means of such a device as I have described the cuff may be quickly secured and permanently held in a position best suited to the requirements of the wearer.

Having thus fully described my invention, I claim as new and desire to secure by Letters Patent—

1. In a fastener, the combination, with a stud formed with a concave head and a hollow shank, of a tubular spring arranged within the shank, and a pin adapted to enter the bore of the spring, substantially as described.

2. In a fastener, the combination, with a stud formed with a hollow shank, 2, of a longitudinal-slotted tubular spring, 3, fitted within the shank 2, a head, 10, consisting of a concave portion, 4, a centrally-apertured facing-plate, 5, fitted to the head, and a pin, 6, provided with an enlarged head, 7, substantially as described.

DAVID STONE.

Witnesses:
   C. SEDGWICK,
   EDWD. M. CLARK.